Figure 1:
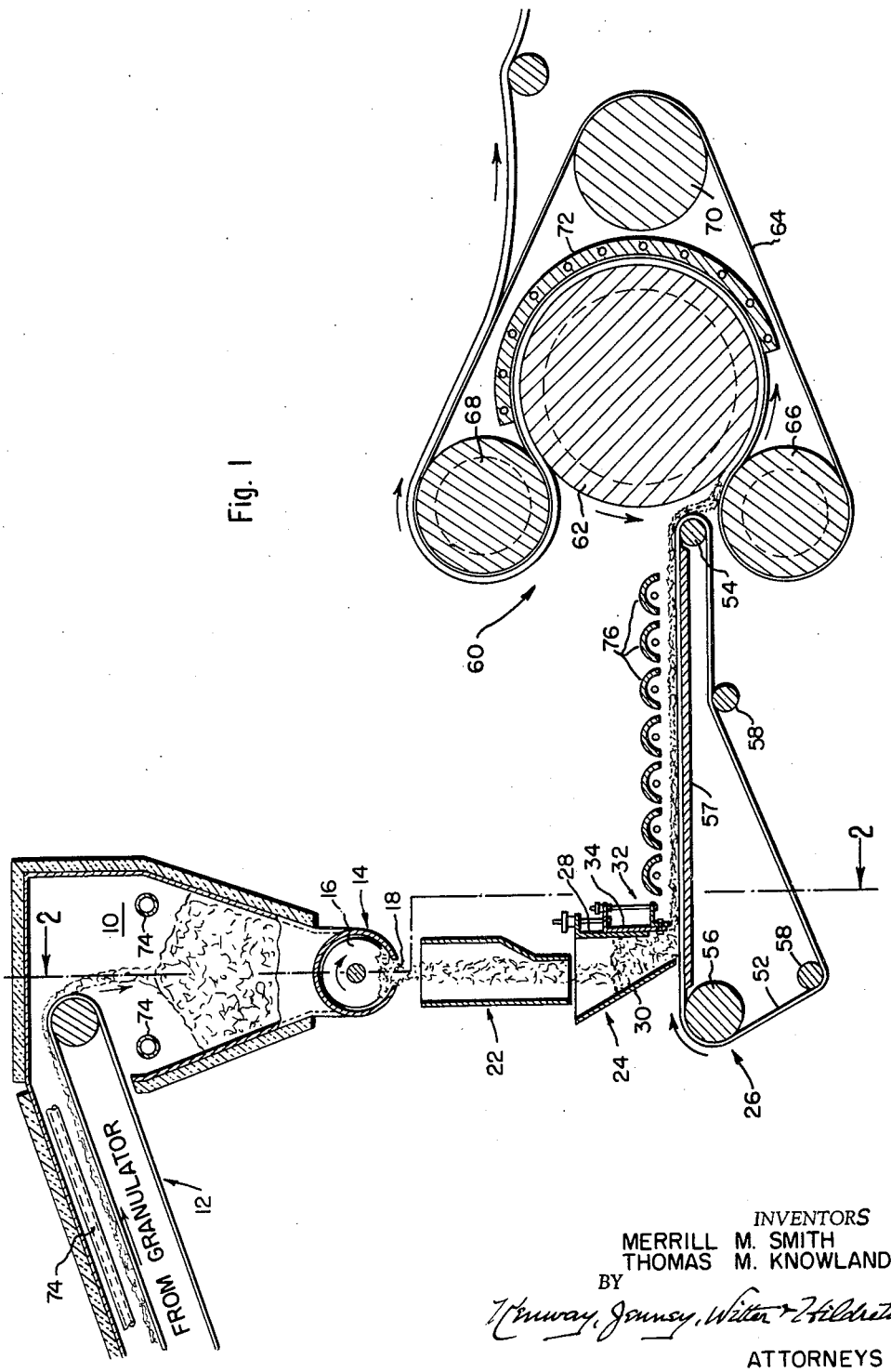

June 19, 1962 — M. M. SMITH ETAL — 3,039,137
APPARATUS FOR FORMING PLASTIC SHEETS
Filed Feb. 10, 1958 — 3 Sheets-Sheet 1

INVENTORS
MERRILL M. SMITH
THOMAS M. KNOWLAND
ATTORNEYS

June 19, 1962  M. M. SMITH ETAL  3,039,137
APPARATUS FOR FORMING PLASTIC SHEETS
Filed Feb. 10, 1958  3 Sheets-Sheet 3
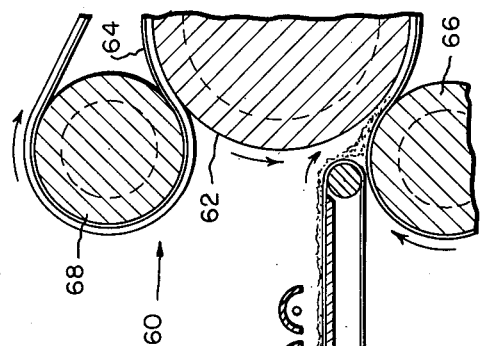
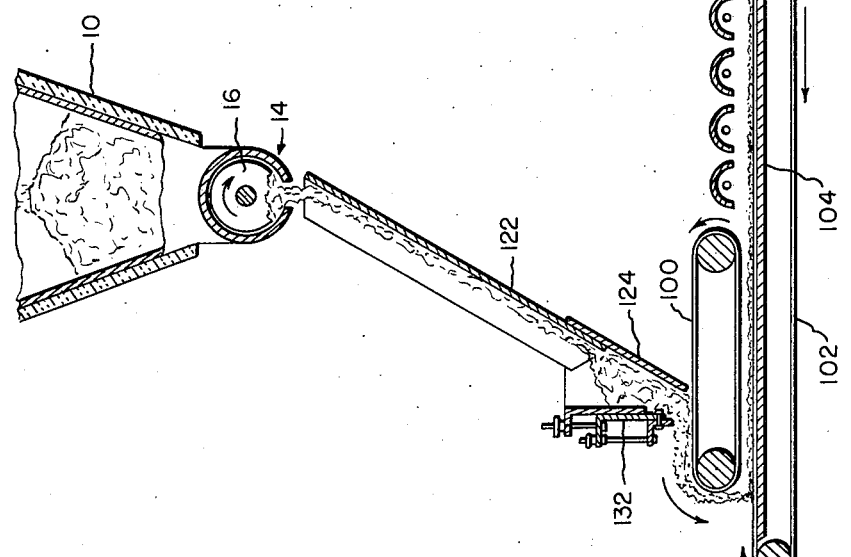
Fig. 3
INVENTORS
MERRILL M. SMITH
THOMAS M. KNOWLAND
BY
ATTORNEYS United States Patent Office 3,039,137
Patented June 19, 1962

3,039,137
APPARATUS FOR FORMING PLASTIC SHEETS
Merrill M. Smith, Morrisville, Pa., and Thomas M. Knowland, Belmont, Mass., assignors to American Biltrite Rubber Co., Inc., Chelsea, Mass., a corporation of Delaware
Filed Feb. 10, 1958, Ser. No. 714,163
1 Claim. (Cl. 18—4)

This invention relates to the manufacture of plastic sheet materials, such as flooring and the like, and more particularly to apparatus therefor. The invention is especially suited to the manufacture of plastic flooring of the terrazzo type wherein coarse multi-colored granular plastic material is formed into a thin uniform layer which is heated and pressed to form a uniform, smooth-surfaced solid sheet.

As employed herein the term "plastic" is used to designate any of the well-known high molecular weight organic resinous solids which may be molded by the application of heat and pressure into durable objects.

In its preferred embodiment the invention is directed to the production of plastic sheet of the terrazzo type, that is to say, material having an appearance resembling terrazzo floor or tiling, which consists of an embedment of multi-colored chips of stone in a base matrix generally of a contrasting color, having a surface that has been ground smooth. Terrazzo tiling has the appearance of random discrete color patches distributed in a background field or matrix of a contrasting color. The manufacture of plastic sheeting of similar appearance according to this invention presents the problem of combining discrete plastic particles or coarse granules in a manner such that their individual identity is preserved and that in appearance they resemble the ground surfaces of the stone chips of its ceramic counterpart. Under the heat and pressure conditions encountered in the formation of plastic sheet materials, there has been heretofore a marked tendency for the individual plastic granules to intermingle and smear. The present invention provides an apparatus which permits the compacting of the granules into sheet form without substantial intermingling and smearing.

This presents a problem in that a thin feed of the granules through a metering slot is inaccurate because of the relatively large size of the granules, whereas it is necessary to arrange the granules in a thin bed in order to raise them all uniformly to the required temperature. These conflicting conditions are reconciled in accordance with the present invention by retaining a large metering slot in the supply hopper—a slot designed to feed a thicker layer of coarse granules than required—and combining this with two or more conveyors operating at progressively greater speeds. For example, a reverse conveyor may be arranged to take the granules from this hopper in a layer of substantial thickness as delivered from the metering slot, and to transfer the relatively thick layer to a second conveyor operated at a substantially higher speed. This sequence of steps spreads the granules in an attenuated layer and thus insures uniform heating thereof in their passage to the pressing or molding elements.

Figure 2:
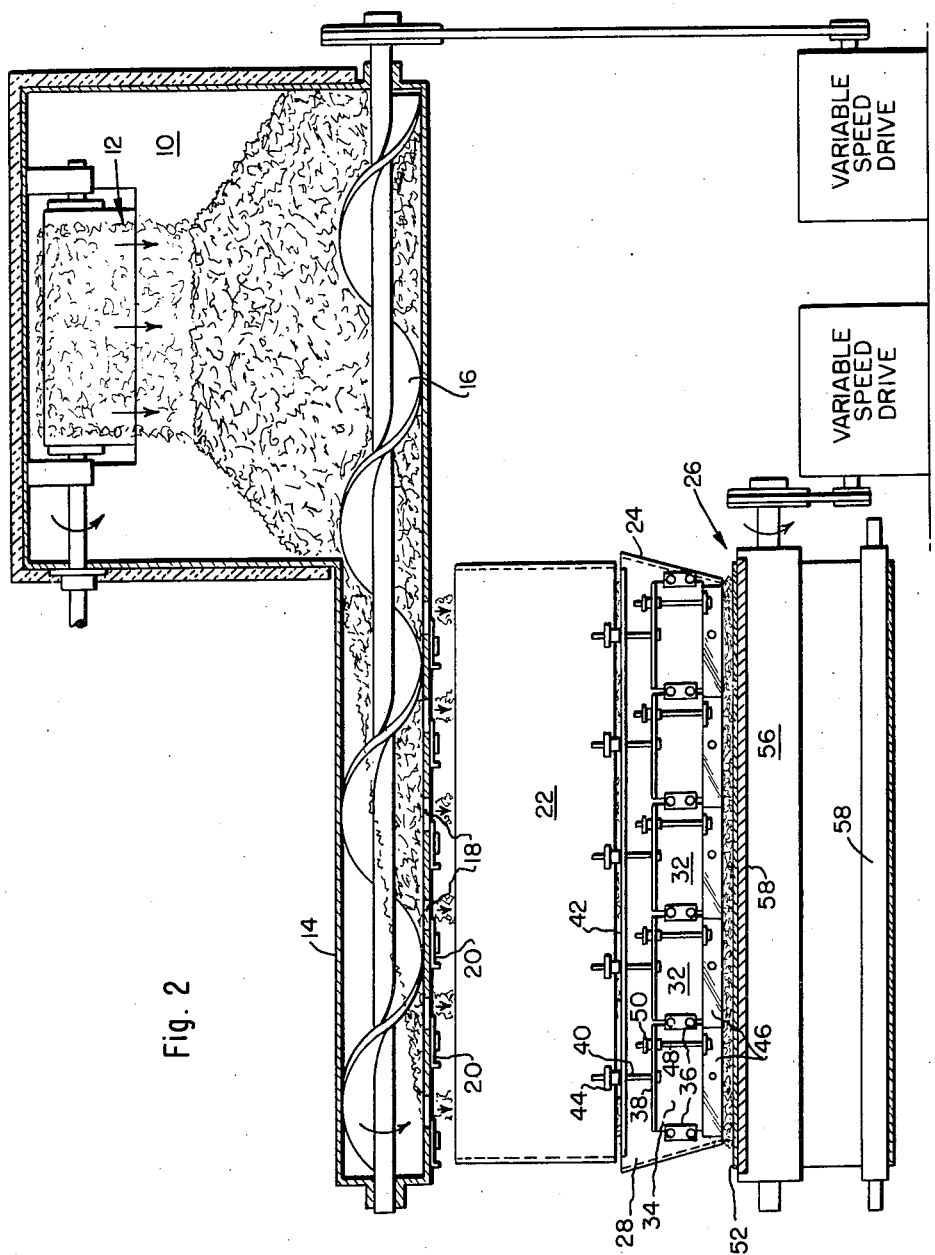

These and other advantages and features of the invention will be best understood and appreciated from the following description of our novel apparatus shown in the accompanying drawings, in which:

FIG. 1 is a side elevation in cross section,
FIG. 2 is a view at 2—2 of FIG. 1, and
FIG. 3 is a view in elevation, partly in section, of a modified and preferred feeding mechanism including a reverse feed conveyor.

The illustrated embodiment of the apparatus is shown as including a conveyor for supplying the granulated resinous material from a granulator. The source of granular material is not critical but may conveniently be the product of the process disclosed in our co-pending application, Serial No. 639,760, filed February 12, 1957, now Patent No. 2,959,632. In the illustrated apparatus the granular material is fed as a traveling layer into a heated press, and this may conveniently be a continuous rotary press of the type described in United States Patent No. 2,039,271, April 28, 1936, Bierer.

In general the apparatus consists of a storage bin 10 which receives heated plastic granules from a belt conveyor 12 that enters the bin at its upper end. The bin and the conveyor are preferably enclosed and lagged with a layer of thermal insulation material so that the granulated resin may be easily maintained in a heated condition. The lower part of the bin is formed with an outwardly projecting distribution head 14 which serves as part of a housing for a screw conveyor 16 traversing the bin and extending the length of the head. The lower part of the head is formed with a line of ports 18, each of which is provided with an adjustable gate or closure 20. These ports serve as outlets for the granular material; the closures 20 are adjusted to provide substantially uniform distribution over the length of the head of this material as it falls from the ports 18.

A transversely elongated distributing chute 22 having a narrow open bottom lies beneath the conveyor casing and receives the granular material as it is discharged from the ports 18 and directs it uniformly into a feed hopper 24 which discharges onto a conveyor 26. The feed hopper 24 is formed with downwardly converging front and rear walls 28 and 30, respectively, the front wall terminating immediately over the conveyor surface. Material fed into the feed hopper is thus discharged onto the conveyor 26 as a layer that is carried along a horizontal path with the conveyor 26.

The thickness and uniformity of the layer fed from the feed hopper is controlled by a series of adjacent gate members or sections 32, each of which may be adjusted vertically and may also be tilted. As shown the gate members are in the form of plates 34 which are held at each edge by a guide flange 36 mounted to the forward wall 28 of the feed hopper. Each of the gate members 32 is provided with an outwardly extending top flange 38 from which extends an upwardly projecting bolt 40. An upper flange 42 extending forward from the forward wall of the feed hopper receives these bolts and thumb nuts 44 engaging the bolts rest on the top surface of the upper flange. A blade 46 pivoted to the lower end of each of the plates 34 forms the lower edge of the gate members and the inclination of each of these is independently adjustable by means of a bolt 48 extending from one end of each blade upwardly through the gate top flange 38 where it is held by a thumb nut 50. Each of the gates 32 will accordingly be seen to be adjustable vertically through the control afforded by the thumb nuts 44 and adjustably tilted through the operation of the thumb nuts 50.

The conveyor 26 consists of an endless belt 52 traveling between a forward roll 54 and a rearward roll 56 over a supporting bed 57 with appropriate idle roll 58 maintaining proper tension. The forward end of the conveyor is located just outside the bite of a rotary press 60 into which the layer of a granular resin is fed. The speed of the conveyor belt 52 is regulated so that the granules delivered by the hopper 24 are spread in a relatively thin uniform layer in passing across the bed 57.

The press consists essentially of a rotatably driven heated drum 62 around an arcuate portion of which is wrapped a steel tension band 64. The granular stock to be processed is fed between the drum 62 and band 64, with the band pressing the stock tightly against the drum. As shown in FIG. 1 the band 64 travels around that portion of the drum 62 between a pressure roll 66 and a driving roll 68 and is doubled back around the rolls 66 and 68 and supported under tension by a tension roller 70. The tension roller 70 is mounted (as by hydraulic means described in United States Patent No. 2,039,271) to be horizontally movable to exert outward pressure maintaining the band 64 under tension. The granular sheet stock is fed from the conveyor 26 to between the band 64 and drum 62 at the nip of the pressure roll 66, travels with the band 62 around the drum and is then carried by the band off the drum and around the drive roll 68, from which it is stripped free. The heated drum supplies heat to the formative sheet from one side while an outer curved heater 72 adjacent to the outside of the band supplies heat to the other side, all as described in further detail in Patent No. 2,114,517.

With many resinous materials it is important that the granular resin be maintained at an elevated temperature in preparation for the molding operation and for this purpose a heating coil 74, e.g. a steam pipe or electrical heater is provided in the storage hopper and conveyor housing, and a battery of radiant heating elements 76 is provided over the conveyor surface so that delivery of the layer of granular material to the heater press at optimum temperature may be assured. With vinyl-chloride resins, for instance, it is desirable to maintain the resin at a temperature of about 300° F. during its delivery to the press and to maintain its temperature during a brief period of storage between about 250° and 275° F.

In addition to the control afforded by the adjustable gates at the discharge of the screw conveyor and the adjustable gates at the discharge of the feed hopper, a further degree of control is provided by varying the speed of both the screw conveyor 16 and the belt conveyor 26, and for this purpose these are shown as being driven by variable speed drives which may be of any conventional construction.

In operation, the apparatus is supplied with heated granular plastic stock, typically from apparatus described in our co-pending application above identified, which is received and stored in heated condition in the bin 10. During storage the material is kept agitated by the screw conveyor 16, which also feeds the granular stock through the ports 18, through the chute 22 to the feed hopper 24. Uniform feeding to the feed hopper is provided through appropriate adjustment of the closures gates 20. From the feed hopper a layer of granular stock is deposited on the belt 52, in a layer of uniform thickness which is assured by appropriate adjustment of the gate members 32.

The layer of granules is now carried past the heating elements 76 where it is heated to a softened condition below its melting point and fed to the press 60. In the press the granular layer is consolidated into a compact solid sheet with no apparent intermixing of the granular or smearing of their surfaces. The sheet is carried out of the press on the tension band 64 and from there it is removed and stored as finished product.

A modified and preferred embodiment of the invention is shown in FIG. 3 whereby a somewhat more accurate distribution and presentation of the granular stock to the rotary press is achieved than by employment of the apparatus described hereinabove.

In the apparatus of FIG. 3 the warm granular product is delivered from the hopper 10 through the head 14 and an inclined chute 122 to a hopper 124 which corresponds to the hopper 24 except that it is reversed to bring the gates 132 into more convenient position for adjustment. The hopper 124 is arranged to discharge directly upon a short endless conveyor belt 100 running over a pair of spaced rolls and driven by a variable speed unit (not shown) from right to left as shown in FIG. 3, or in a direction away from the rotary press 60. The speed of the conveyor 100 is regulated to take the granules away in a relatively thick layer from the metering slot of the hopper which must be of sufficient width to pass the thick solid granules without obstruction.

The conveyor 100 immediately transfers its layer of granules to an endless conveyor belt 102 running beneath it in the opposite direction, i.e. toward the rotary press 60 across a supporting structure 104. The conveyor 102 is operated at a speed substantially higher than that of the conveyor 100 and so makes a corresponding reduction in the thickness of the granule layer. For example, if the speed of the conveyor 102 is three times that of the conveyor 100, the granular layer will be attenuated to one third the thickness of the layer carried by the conveyor 100 and this thinner layer will pass in uniformly distributed condition beneath the battery of heat lamps 76.

An important aspect of the process of this invention is the preheating by which the plastic granules are initially softened to render them mutually conformable during pressing without smearing or melting. Heating is thus regulated to place the granules in a plastic condition such that they deform sufficiently to consolidate themselves together immediately upon the application of the pressure of the press but without smearing or blotching. The result achieved is superior in producing a realistic terrazzo pattern to that realized when cold granules are fed to a heated press, for then the outermost parts of the granules are first softened to an extent that consolidation of the granules is mostly through deformation of the outermost granules. Moreover, where heating to soften the granules thoroughly is carried out in the press, the inner portions are generally not softened until the outer portions are overly softened or melted. The present invention avoids these difficulties by preliminarily thermo-softening the granules so that they are initially readily and uniformly deformable. The heated press serves to maintain the granules in their heated soft state throughout the pressing operation, but does not bring the granules to that state.

The temperature to which the granules should be brought prior to pressing will depend on the nature of the plastic material used in the process. In any case the temperature will be between the softening point and the melting point of the plastic. Typically the plastic used may be plasticized and pigmented vinyl chloride which is soft in the temperature range of about 295 to 325° F. In a preferred procedure such granules are delivered from the granulator at a temperature of between about 250° and 275° F. and are briefly stored and uniformly heated in the bin at that temperature. The layer of granules deposited on the conveyor belt is then heated by the heating units 76 to a temperature of about 300° F. before being delivered into the bite of the rotary press which is then adjusted to maintain the temperature of the compacted plastic sheet at about 340° F. As the formed sheet is carried from the rotary press on the pressure band, it cools sufficiently to permit its removal as completed product ready for its preparation for sale or use.

This application is a continuation in part of our pending application Ser. No. 651,611, filed April 9, 1957 and now abandoned.

Having thus disclosed our invention what we claim as new and desire to secure by Letters Patent is:

Apparatus for forming plastic flooring of the terrazzo type from discrete coarse granules, comprising an overhead bin for storing a quantity of said granules, means in the bin for preheating the granules to a temperature slightly below their softening point, a conveyor belt mounted below said bin, a chute mounted between said bin and said belt, means for transferring granules from the bin to said chute, said chute being provided at its lower portion with a series of gate sections independently mounted and adjustable both vertically and angularly for discharging the granules and delivering them in a layer of uniform thickness to said belt, means for heating the granules on said belt to a temperature above their softening point but below their melting point, and continuously acting means for subsequently further heating and pressing the granules so discharged and forming them into a solid integral sheet in the surface of which the granules are exposed to view without loss of identity.

References Cited in the file of this patent

UNITED STATES PATENTS

| | | |
|---|---|---|
| 1,939,045 | Fredriksen | Dec. 12, 1933 |
| 2,033,735 | Pack | Mar. 10, 1936 |
| 2,069,589 | Meijling et al. | Feb. 2, 1937 |
| 2,303,288 | Lester | Nov. 24, 1942 |
| 2,353,362 | Rudd | July 11, 1944 |
| 2,379,831 | Scherer | July 3, 1945 |
| 2,486,346 | Wachs | Oct. 25, 1949 |
| 2,523,670 | Schueler | Sept. 26, 1950 |
| 2,529,830 | Bieier | Nov. 14, 1950 |
| 2,579,770 | Uschmann | Dec. 25, 1951 |
| 2,580,200 | Shrimpton | Dec. 25, 1951 |
| 2,604,972 | Schmied | July 29, 1952 |
| 2,605,506 | Miller | Aug. 5, 1952 |
| 2,623,239 | Fischbein | Dec. 30, 1952 |
| 2,623,676 | Baker et al. | Dec. 30, 1952 |
| 2,641,296 | Marco | June 9, 1953 |
| 2,678,081 | Rainard et al. | May 11, 1954 |
| 2,694,831 | Benedict et al. | Nov. 23, 1954 |
| 2,696,330 | Fahrni | Dec. 7, 1954 |
| 2,737,997 | Himmelheber et al. | Mar. 13, 1956 |
| 2,743,758 | Uschmann | May 1, 1956 |
| 2,757,115 | Heritage | July 31, 1956 |
| 2,811,195 | Kloss | Oct. 29, 1957 |